United States Patent
Raviv et al.

[11] Patent Number: 6,061,052
[45] Date of Patent: May 9, 2000

[54] DISPLAY POINTING DEVICE

[76] Inventors: Roni Raviv, 13 Simtat Dalia, Nes Ziona 74061; Omri Rothschild, 32 Avner Street, Tel Aviv 69937, both of Israel

[21] Appl. No.: 08/990,623

[22] Filed: Dec. 15, 1997

[30] Foreign Application Priority Data

Feb. 9, 1997 [IL] Israel .................................. 120186

[51] Int. Cl.⁷ .............................. G09G 1/00; G09G 5/00; F16D 3/54
[52] U.S. Cl. .......................... 345/180; 345/165; 463/49
[58] Field of Search .................................. 345/180, 182, 345/165, 166, 173, 174, 175; 178/18.01, 18.03, 18.06, 18.07, 18.09, 18.1, 19.01–19.05; 463/1–2, 49–53, 56–57

[56] References Cited

U.S. PATENT DOCUMENTS

| | | | |
|---|---|---|---|
| 3,505,561 | 4/1970 | Ward et al. | 315/18 |
| 3,506,875 | 4/1970 | Watanabe et al. | 315/12 |
| 3,543,240 | 11/1970 | Miller et al. | 340/172.5 |
| 3,551,896 | 12/1970 | Baskin et al. | 340/172.5 |
| 3,576,574 | 4/1971 | Baskin | 340/324 |
| 3,594,608 | 7/1971 | Mutton | 315/24 |
| 3,659,281 | 4/1972 | Mori | 340/324 A |
| 3,758,717 | 9/1973 | Granzotti | 178/6.8 |
| 3,832,693 | 8/1974 | Ishizaki et al. | 340/172.5 |
| 3,944,988 | 3/1976 | Mayer | 340/172.5 |
| 3,993,861 | 11/1976 | Baer | 178/5.6 |
| 4,126,851 | 11/1978 | Okor | 340/324 AD |
| 4,185,825 | 1/1980 | Bromley | 273/101.2 |
| 4,190,851 | 2/1980 | Finnila et al. | 357/30 |
| 4,205,847 | 6/1980 | Steiger et al. | 273/313 |
| 4,210,329 | 7/1980 | Steiger et al. | 273/313 |
| 4,243,972 | 1/1981 | Toussaint | 340/146.3 SY |
| 4,367,465 | 1/1983 | Mati et al. | 340/707 |
| 4,377,810 | 3/1983 | Wolff | 340/707 |
| 4,395,045 | 7/1983 | Baer | 273/312 |
| 4,591,841 | 5/1986 | Gunderson et al. | 340/707 |
| 4,602,907 | 7/1986 | Foster | 434/337 |
| 4,608,601 | 8/1986 | Shreck et al. | 358/146 |
| 4,675,665 | 6/1987 | Halliwell | 340/707 |
| 4,813,682 | 3/1989 | Okada | 273/312 |
| 4,815,733 | 3/1989 | Yokoi | 273/1 E |
| 4,922,236 | 5/1990 | Heady | 340/710 |
| 4,956,639 | 9/1990 | Uemura et al. | 340/707 |
| 4,979,029 | 12/1990 | Lemelson | 358/93 |
| 4,984,073 | 1/1991 | Lemelson | 358/93 |
| 4,999,617 | 3/1991 | Uemura et al. | 340/706 |
| 5,051,736 | 9/1991 | Bennett et al. | 340/707 |
| 5,119,075 | 6/1992 | Smith | 340/707 |
| 5,134,389 | 7/1992 | Furuta et al. | 340/707 |
| 5,138,304 | 8/1992 | Bronson | 340/707 |
| 5,179,368 | 1/1993 | Lippincott | 340/707 |
| 5,184,115 | 2/1993 | Black et al. | 340/708 |
| 5,187,467 | 2/1993 | Myers | 340/707 |
| 5,194,008 | 3/1993 | Mohan et al. | 434/22 |
| 5,310,192 | 5/1994 | Miyake | 273/310 |
| 5,572,251 | 11/1996 | Ogawa | 348/207 |
| 5,610,629 | 3/1997 | Bauer | 345/104 |
| 5,831,601 | 11/1998 | Vogeley et al. | 345/175 |
| 5,852,434 | 12/1998 | Sekendur | 345/179 |

*Primary Examiner*—Richard A. Hjerpe
*Assistant Examiner*—Duc Dinh
*Attorney, Agent, or Firm*—Abelman, Frayne & Schwab

[57] ABSTRACT

This invention discloses a display pointing device inclduing a housing, an optical sensor mounted in the housing, and processing circuitry receiving an output from the optical sensor for identifying a location on a display pointed to by the pointing device based on the optically sensible characteristics of at least one pattern at the location which is sensed by the optical sensor. A method for operating the display pointing device is also disclosed.

32 Claims, 16 Drawing Sheets

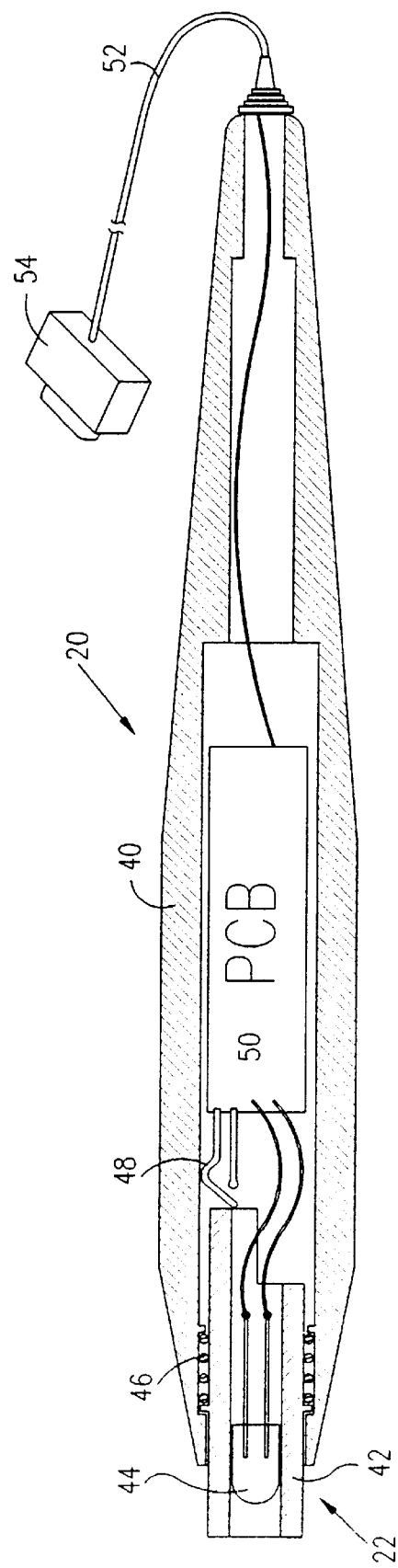

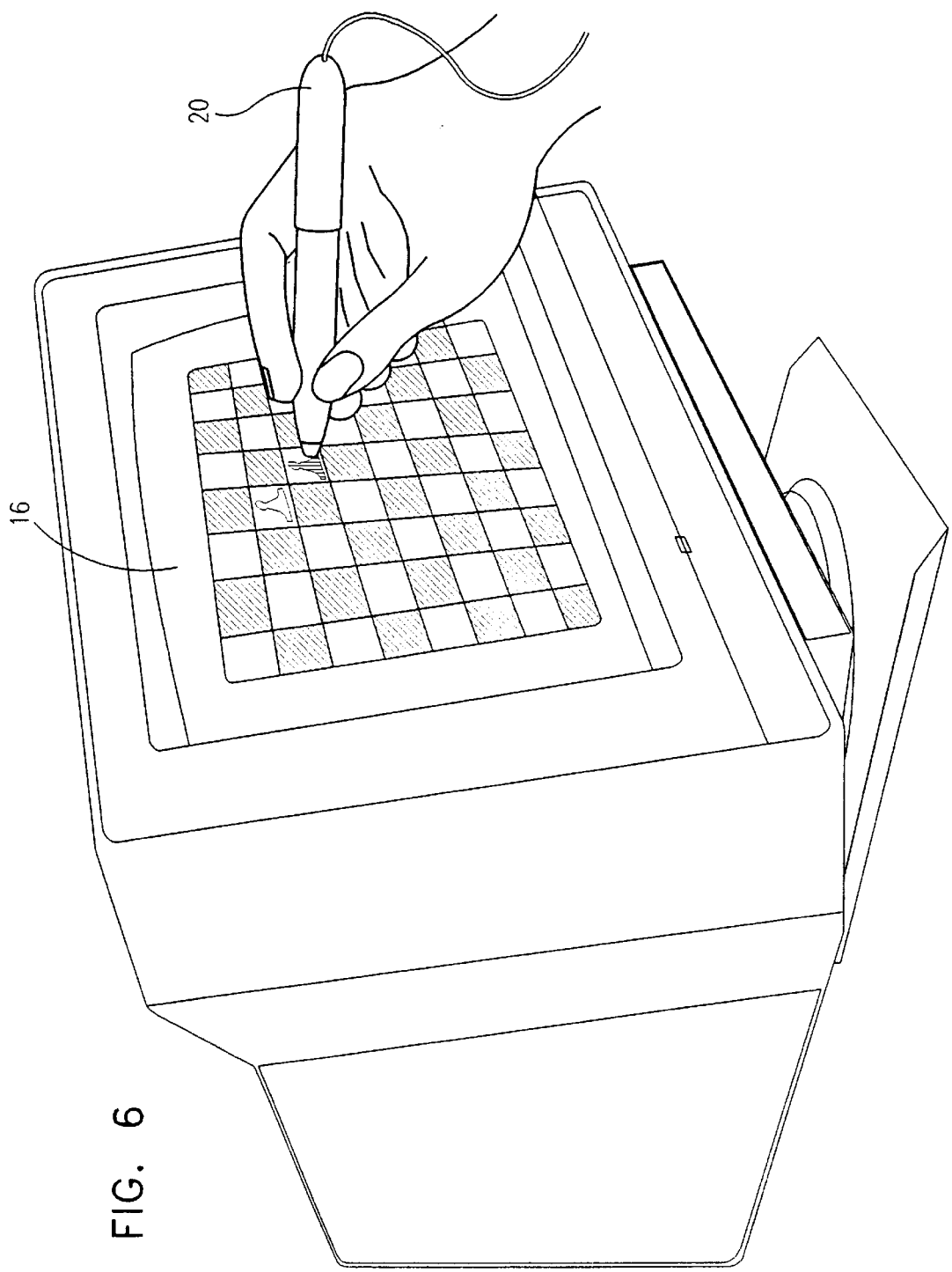

DISPLAY POINTING DEVICE

FIELD OF THE INVENTION

The present invention relates to display pointers which can be used to indicate a location on a display, such as a computer display.

BACKGROUND OF THE INVENTION

Various types of display pointers are known in the art. These include devices such as "light pens" or toy firing devices which can be pointed at or brought into propinquity with a given location on a display, such as a CRT display, for sensing illumination features thereof. Conventional light pens of this type require relatively complex synchronization circuitry for determining location on the display based on the time relationship of sensed illumination and of the time base of the display, including its synchronization pulses.

Prior art pointers of the type described hereinabove often require feedback in order to achieve location sensing. In practice a sensor on the pointer feeds back a signal that it sensed on the screen to a timing circuit in a computer. The timing circuit determines the time relationship of the sensed signal to the vertical and horizontal video synchronization signals of the screen and thus determines the position of the pointer on the screen.

The current state of the art is believed to be represented by the following U.S. Patents: U.S. Pat. Nos. 5,187,467; 5,184,115; 5,119,075; 4,608,601; 4,602,907; 4,190,851; 3,944,988; 3,832,693; 3,758,717; 3,659,281; 3,594,608; 3,576,574; 3,551,896; 3,543,240; 3,506,875; 3,505,561; 5,572,251; 5,138,304; 5,134,389; 5,051,736; 4,956,639; 4,922,236; 4,675,665; 4,591,841; 4,377,810 & 4,367,465.

SUMMARY OF THE INVENTION

The present invention seeks to provide an improved, relatively low cost display pointing device having multiple and varied applications.

There is thus provided in accordance with a preferred embodiment of the present invention a display pointing device including:

a housing;

an optical sensor mounted in the housing; and processing circuitry receiving an output from the optical sensor for identifying a location on a display pointed to by the pointing device based on the optically sensible characteristics of at least one pattern sensed by the optical sensor.

There is also provided in accordance with a preferred embodiment of the present invention a display pointing method including:

pointing an optical sensor mounted in the housing at a location on a display;

receiving an output from the optical sensor; and identifying a location on the display pointed to by the pointing device based on the optically sensible characteristics of at least one pattern sensed by the optical sensor.

In accordance with one embodiment of the present invention, the processing circuitry determines a location on the display pointed to by the pointing device based on the optically sensible characteristics of a plurality of patterns, which are seen sequentially by the optical sensor and which are optically distinguishable from each other.

The at least one pattern may or may not be superimposed on a displayed image, as by eliminating lines in a displayed image. The at least one pattern may cover the entire display or only parts thereof.

The processing circuitry may employ pattern recognition circuitry which may be hard wired or embodied, wholly or partly in software.

The pointer may be used with a CRT display or alternatively with other types of display such as liquid crystal displays.

BRIEF DESCRIPTION OF THE DRAWINGS

The present invention will be understood and appreciated more fully from the following detailed description, taken in conjunction with the drawings in which:

FIG. 4 is a simplified sectional illustration of a preferred pointer constructed and operative in accordance with a preferred embodiment of the present invention;

FIG. 6 is a simplified illustration of a CRT pointing system constructed and operative in accordance with another preferred embodiment of the present invention;

LIST OF APPENDICES

Figure 5A:
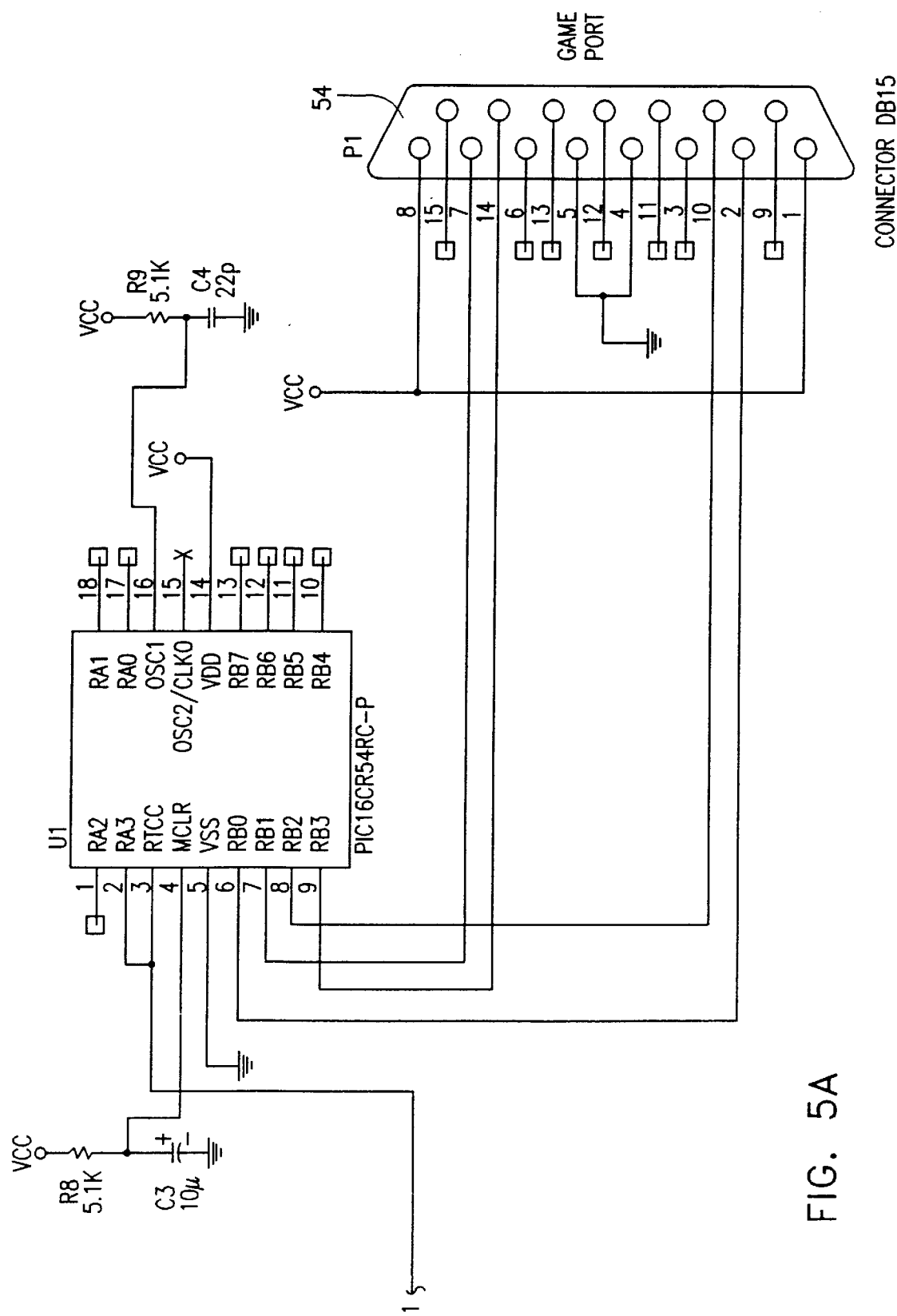
FIGS. 5A and 5B together are an electrical schematic illustration of a preferred embodiment of the pointer of FIG. 4.
Figure 5B:
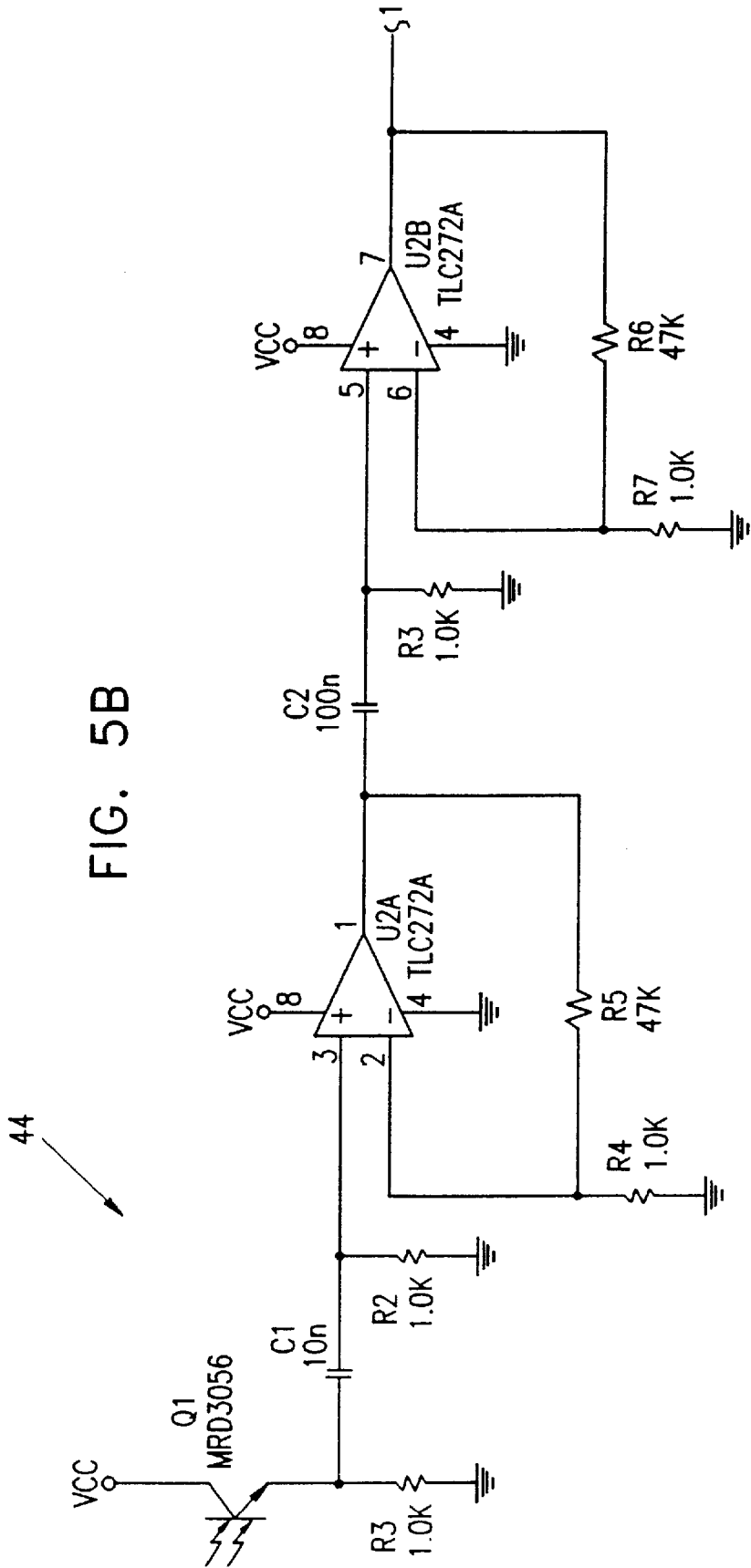

Appendix 1 is listing of software embodied in a microcontroller forming part of the circuitry of FIG. 5B.

DETAILED DESCRIPTION OF PREFERRED EMBODIMENTS

Figure 1:
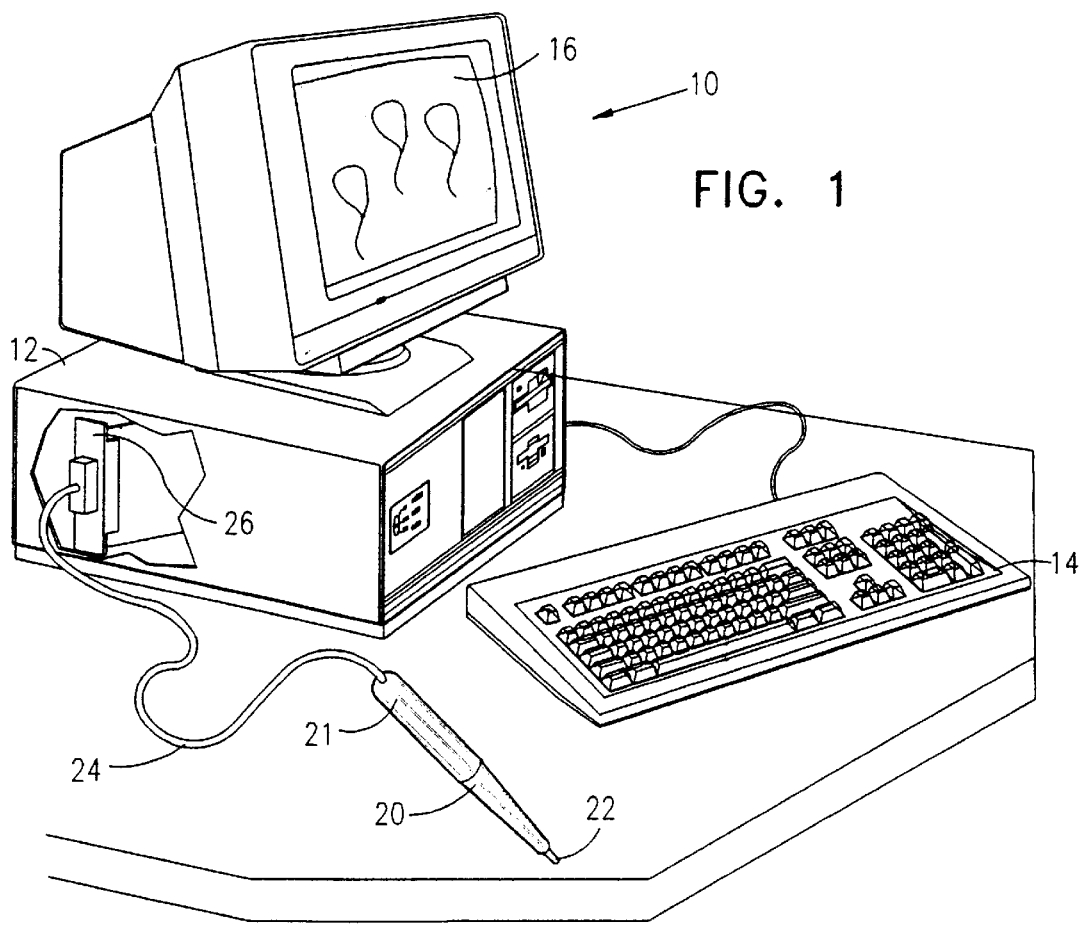
FIG. 1 is a simplified illustration of a CRT pointing system constructed and operative in accordance with a preferred embodiment of the present invention.

Reference is now made to FIG. 1, which is a simplified illustration of a CRT pointing system constructed and operative in accordance with a preferred embodiment of the present invention. The system comprises a conventional computer 10 including a circuit board housing 12, a keyboard 14 and a display 16, such as a CRT display. In accordance with a preferred embodiment of the present invention, there is additionally provided a pointer 20 which can be used to point to a given location on the display 16, as figuratively illustrated in FIG. 2A.

In accordance with a preferred embodiment of the present invention, the pointer 20 includes a hand held housing 21 within which is disposed an optical sensor which is preferably located at a tip 22 thereof. The optical sensor is coupled by a wire 24 or alternatively in a wireless manner to processing circuitry which may be located within the housing 21 or alternatively in a circuit board 26 located within circuit board housing 12.

Figure 2A:
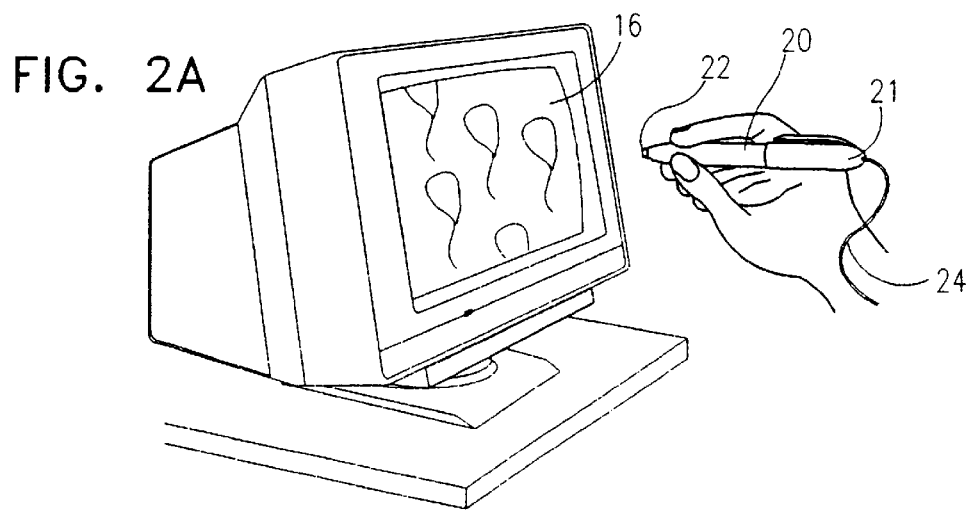
FIGS. 2A, 2B and 2C illustrate the operation of a CRT pointing system of FIG. 1.
Figure 2B:
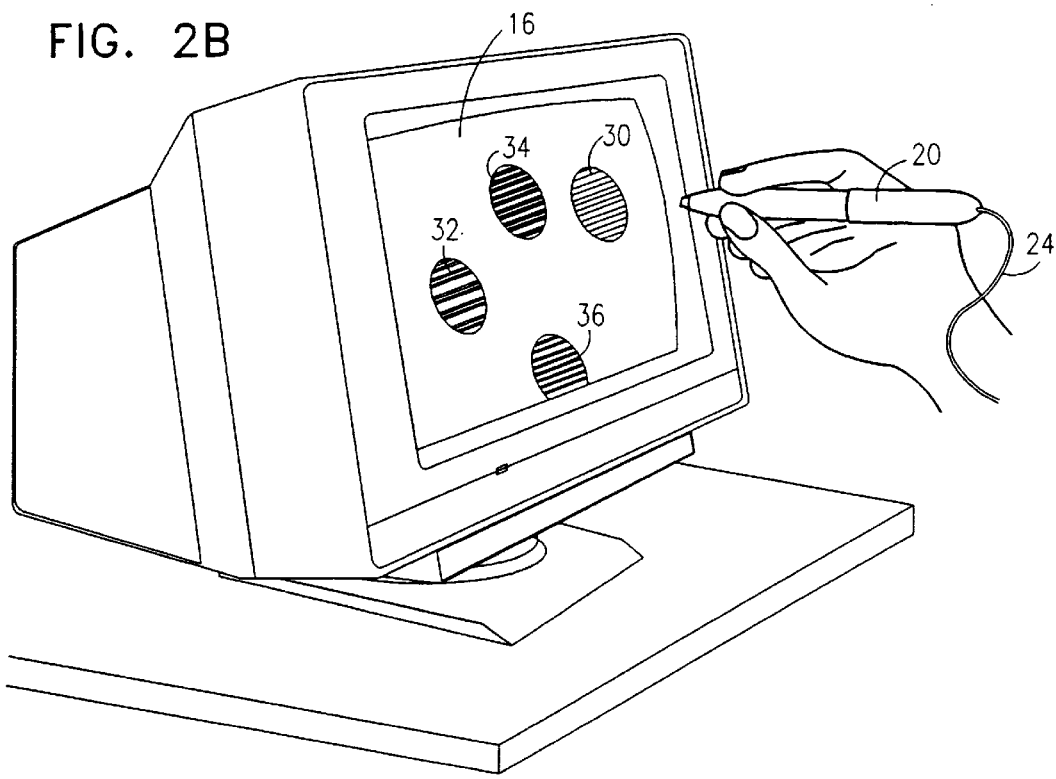
Figure 2C:
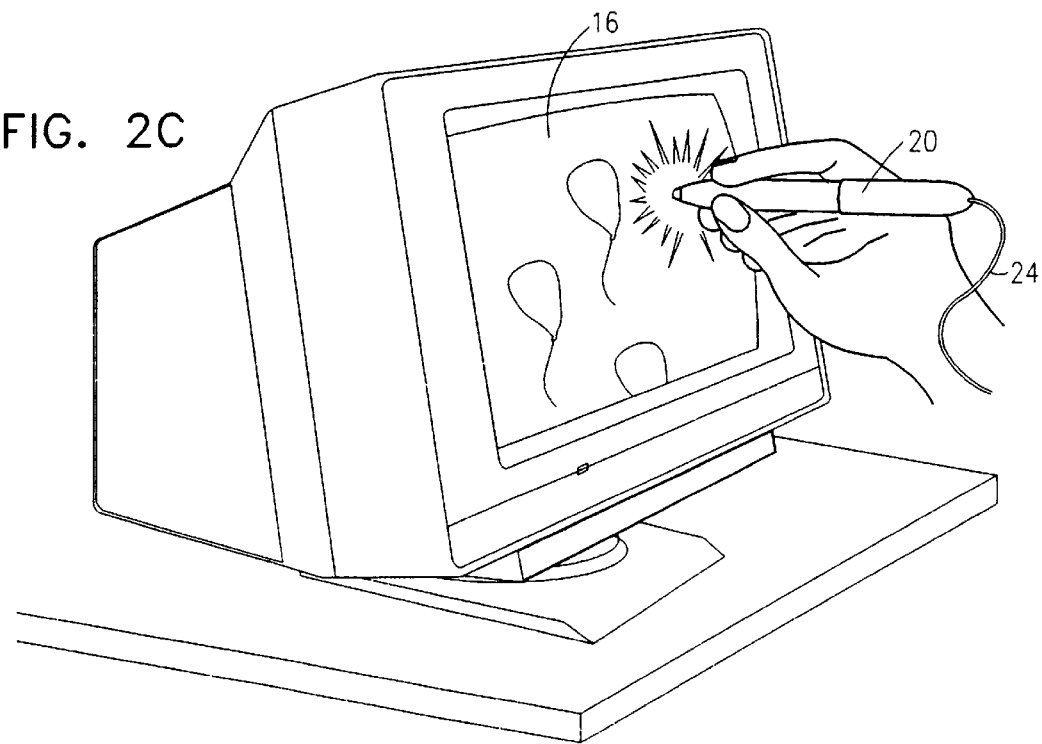

FIGS. 2A, 2B and 2C illustrate the operation of the CRT pointing system of FIG. 1 in accordance with one embodiment of the present invention in the context of a simple game in which the user bursts balloons by pointing at them. The user normally sees what is illustrated in FIG. 2A, however, in accordance with a preferred embodiment of the invention, intermittently and for a duration which preferably is so short that it cannot be seen by the user, each of the balloons is indicated by a differing pattern, as seen in FIG. 2B. This pattern is sensed by the optical sensor in the pointer 20 and is recognized by the processing circuitry downstream thereof. Once a given pattern corresponding to a given balloon is recognized, the processing circuitry provides an output indication which causes a burst balloon image to appear on the display, as illustrated in FIG. 2C.

Figure 3A:
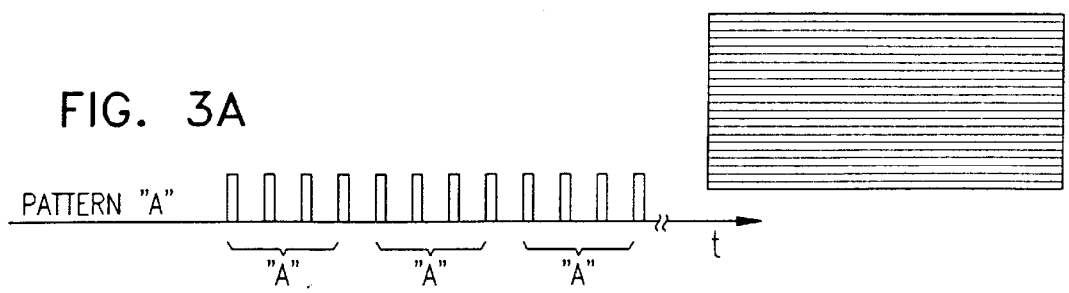
FIGS. 3A, 3B, 3C, 3D and 3E are illustrations of five coded patterns employed in the system of FIGS. 2A–2C and corresponding pulse trains sensed by a pointer viewing such patterns.
Figure 3B:
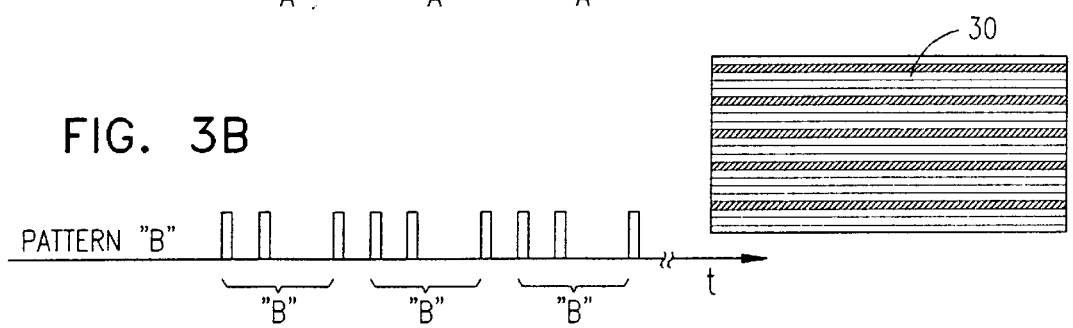
Figure 3C:
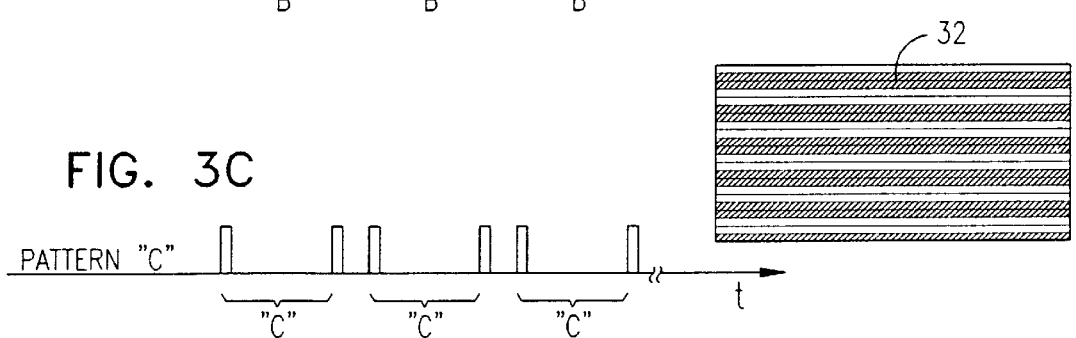
Figure 3D:
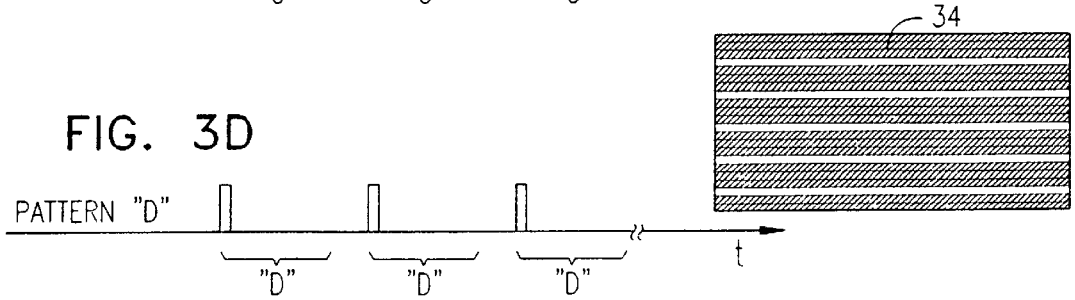
Figure 3E:
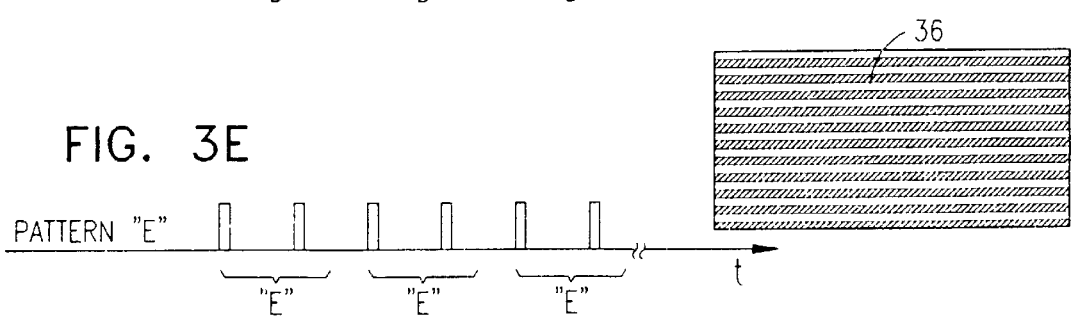

Reference is now made to FIGS. 3A, 3B, 3C, 3D and 3E, which are illustrations of five coded patterns employed in the system of FIGS. 2A–2C and corresponding pulse trains sensed by a pointer viewing such patterns. FIG. 3A illustrates a blank screen which contains all scan lines, while FIGS. 3B, 3C, 3D and 3E illustrate the patterns of balloons which are indicated by respective reference numerals 30, 32, 34 and 36 in FIG. 2B. It is to be appreciated that preferably, the optical sensor senses the pulse train corresponding to each of the patterns without requiring synchronization with the vertical and horizontal synchronization pulses employed by the display.

Reference is now made to FIG. 4, which is a simplified sectional illustration of a preferred pressure-actuated pointer 20 constructed and operative in accordance with a preferred embodiment of the present invention. The pointer preferably comprises a housing 40 having a spring biased retractable tip 42 in which is disposed an optical sensor 44, such as a Motorola MRD 3056 phototransistor.

Retraction of tip 42 against the urging of a spring 46 is operative to close a switch, shown schematically at reference numeral 48. The output of optical sensor 44 is preferably supplied to processing circuitry located on a printed circuit board 50 which communicates via a cable 52 and a connector 54 with suitable circuitry within circuit board housing 12 (FIG. 1).

Reference is now made to FIGS. 5A and 5B, which together are an electrical schematic illustration of a preferred embodiment of the pointer of FIG. 4. It is seen that the optical sensor 44 is preferably a phototransistor such as an MRD 3056 which outputs via an amplification circuit to a signal processing circuit U1, such as a PIC16CR54RC-P microcontroller. The signal processing circuit is in turn coupled to connector 54, which is typically a DB15 connector which interfaces with a conventional game port of any suitable PC computer.

Reference is now made to FIG. 6, which is a simplified illustration of a CRT pointing system constructed and operative in accordance with another preferred embodiment of the present invention. In this embodiment, rather than sensing a pattern, the optical sensor and associated processing circuitry senses a series of sequential patterns, the combination of which indicated a particular location on the display 16.

Figure 7C:
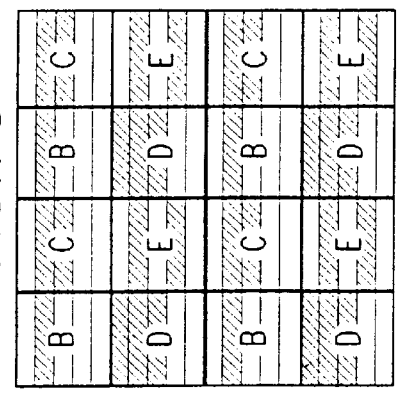
FIGS. 7A, 7B, 7C, 7D and 7E illustrate the operation of a CRT pointing system of FIG. 6.
Figure 8:
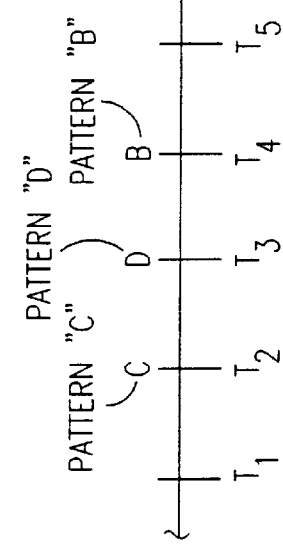
FIG. 8 is a timing diagram related to the operation of the embodiment of FIGS. 6–7E.
Figure 7B:
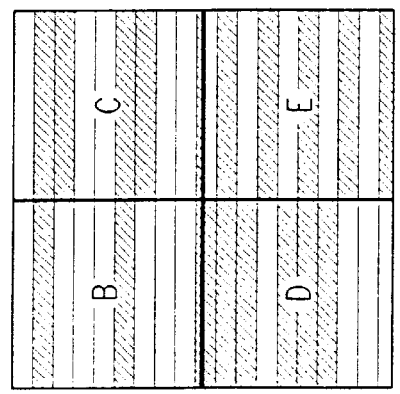
Figure 7E:
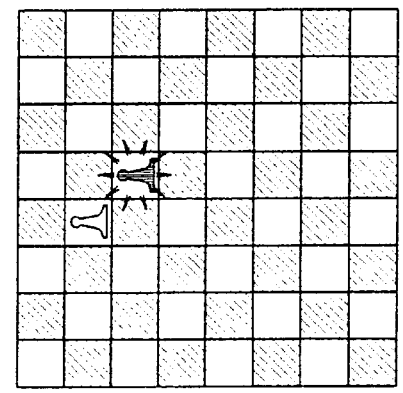
Figure 7A:
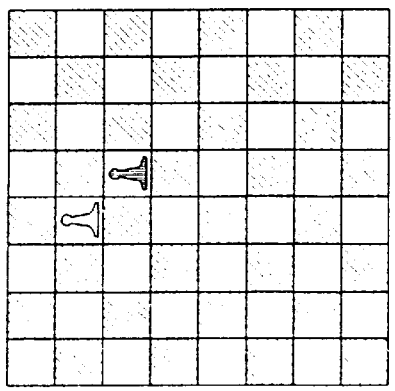
Figure 7D:
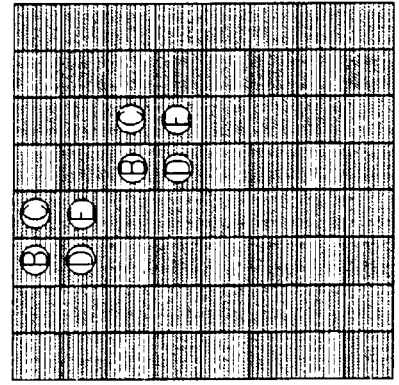

Referring now to FIGS. 7A, 7B, 7C, 7D and 7E and the timing diagram of FIG. 8, it can be seen that while the user sees the display shown in FIG. 7A, in accordance with a preferred embodiment of the invention, and as distinguished from the embodiment of FIGS. 2A–3E, sequentially and over a duration which preferably is so short that it cannot be seen by the user, each of the patterns of FIGS. 7B, 7C, and 7D appears on the display at least on the portion of the display which the pointer is pointing to.

The sequence of patterns sensed by the optical sensor in the pointer 20 and is recognized by the processing circuitry downstream thereof. Once a given pattern sequence corresponding to a given location is recognized, the processing circuitry provides an output indication which causes an illuminated symbol to appear on the display at the given location, as illustrated in FIG. 7E.

FIG. 8 illustrates the identity of the pattern which is sensed by the optical sensor, aimed at the black pawn, at various times. Thus at time T1, which corresponds to FIG. 7A, no pattern is sensed. At time T2, pattern C (FIG. 7B) is sensed. At time T3, pattern D (FIG. 7C) is sensed, at time T4, pattern B (FIG. 7D) is sensed and at time T5, no pattern is sensed, as indicated in FIG. 7E.

Figure 9:
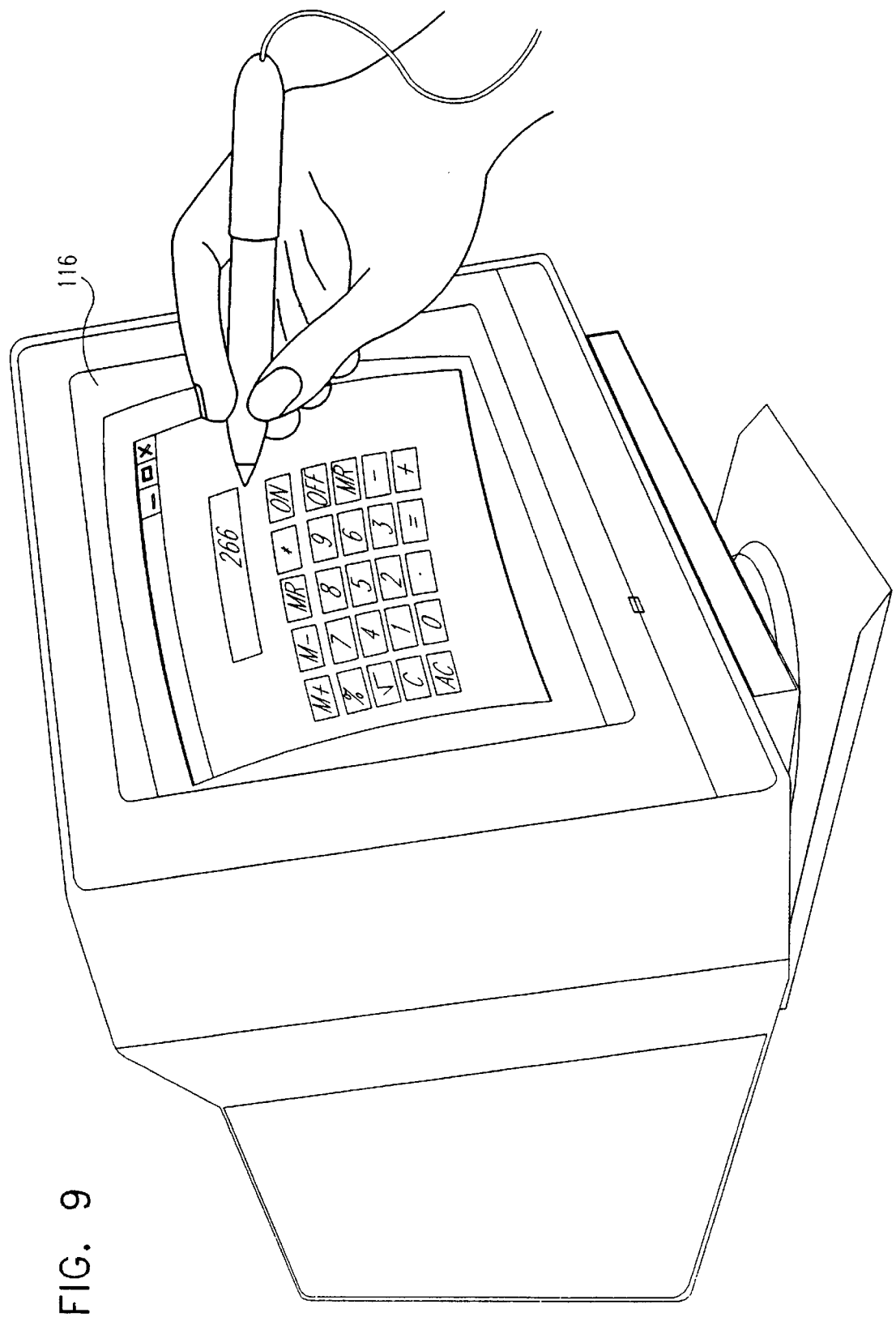
FIG. 9 is a simplified illustration of a CRT pointing system constructed and operative in accordance with still another preferred embodiment of the present invention.

Reference is now made to FIG. 9, which is a simplified illustration of a CRT pointing system constructed and operative in accordance with still another preferred embodiment of the present invention. A standard computer application is shown on the display screen 116.

Referring additionally to FIGS. 10A, 10B, 10C and 10D it is seen that in contrast to the pointing systems described hereinabove, wherein each region has a unique pattern or patterns which is not sensitive to pen position within the region, here highly accurate vertical position sensing is provided.

Figure 10A:
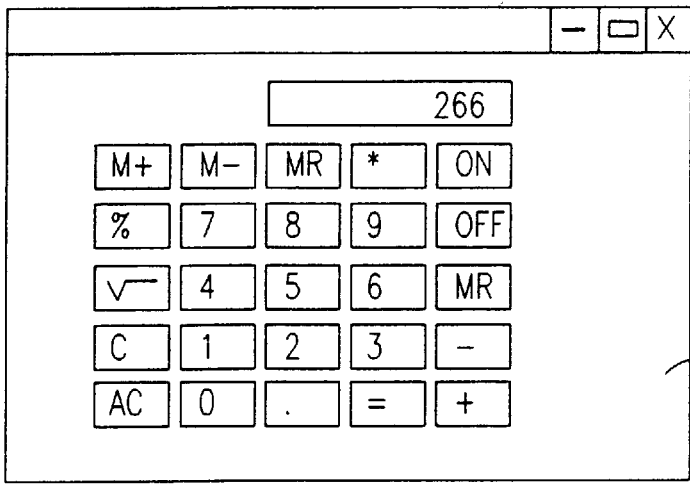
FIGS. 10A, 10B, 10C and 10D illustrate the operation of a CRT pointing system of FIG. 9.
Figure 10B:
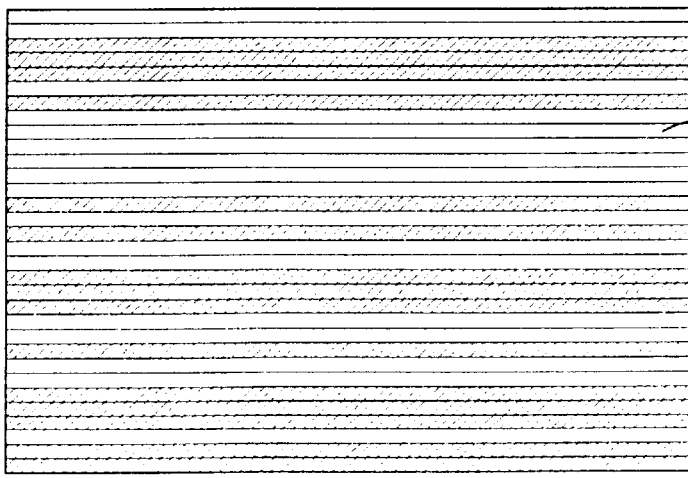
Figure 10C:
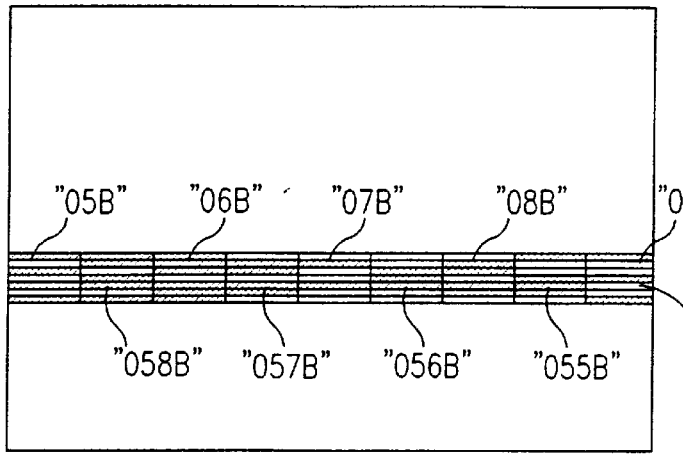
Figure 10D:
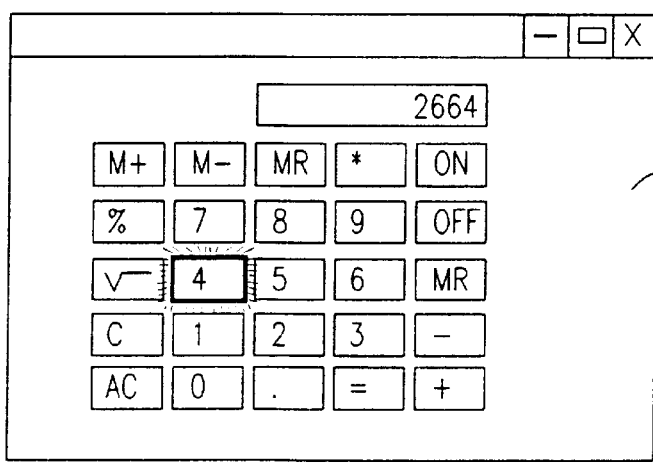

FIG. 10A shows the screen 116 that is normally viewed by the user, while FIGS. 10B and 10C illustrate sequential patterns 120, 122 which appear on the display screen 116 to provide position determination. The pattern 120 of FIG. 10B is a series of vertical lines which enable vertical position therealong to be sensed unambiguously, while the pattern 122 of FIG. 10C is a pattern which enables horizontal position to be sensed, albeit to a lesser degree of resolution than that realized for the vertical position. FIG. 10D illustrates the appearance of display screen 116 when the pointer is pointing at the "4" key.

Figure 11A:
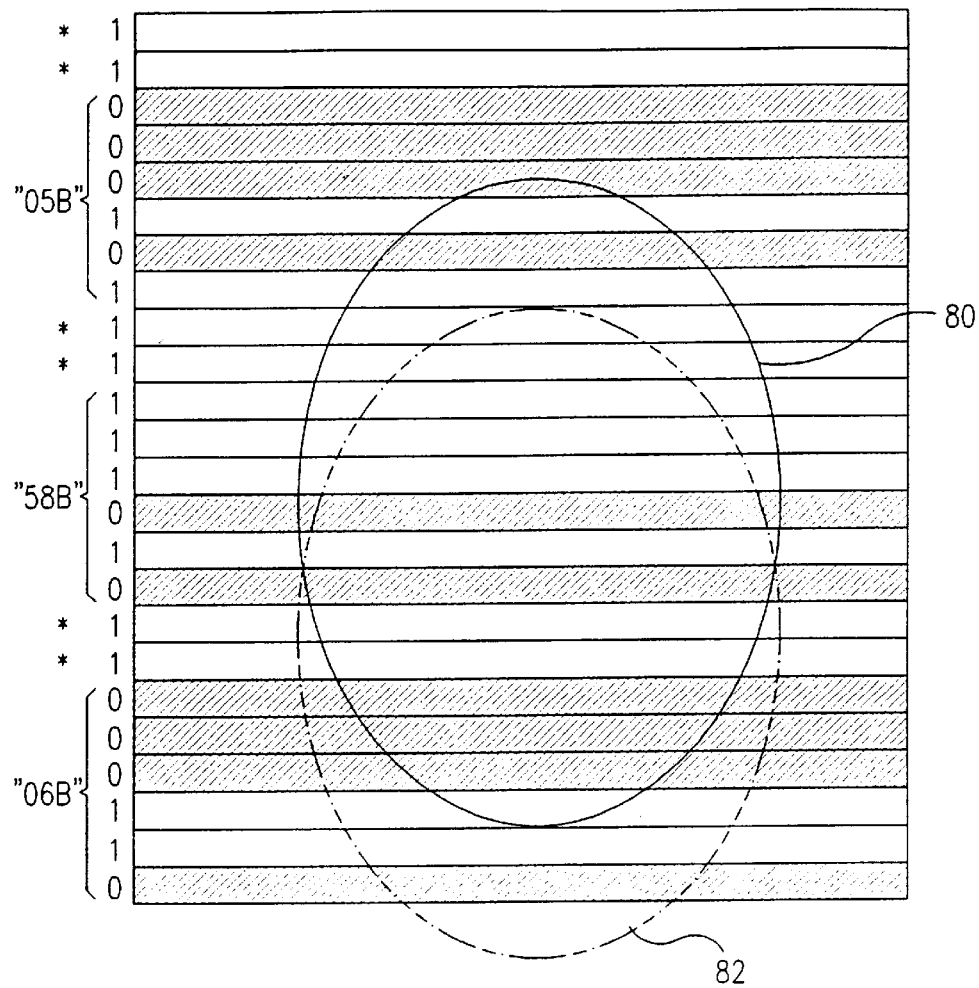
FIGS. 11A, 11B and 11C illustrate the operation of the embodiment of FIGS. 9–10D.

The pattern of FIG. 11A is a particularly useful arrangement of lines for unambiguously indicating vertical position, it being understood that various other arrangements may be employed. The pattern of FIG. 11A is built of pairs of illuminated horizontal lines, each indicated by an asterix, separated by typically six lines which may or may not be illuminated in accordance with a given binary code. The six horizontal lines thus provide 64 different coded combinations.

In order to minimize ambiguity, the pattern of FIG. 11A employs successive inversely coded arrangements. Thus the first group of six horizontal lines represents the binary number "5" and the successive group of six horizontal lines represents the binary number "58". The next group of six horizontal lines represents the binary number 6, and the next successive group of six horizontal lines represents the binary number "57".

Figure 11B:
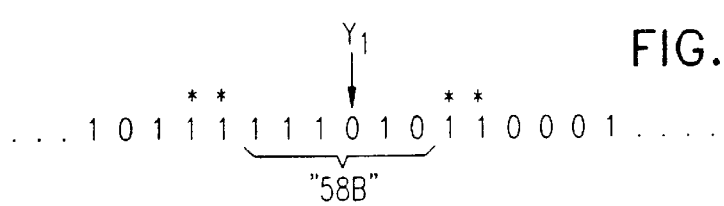
Figure 11C:
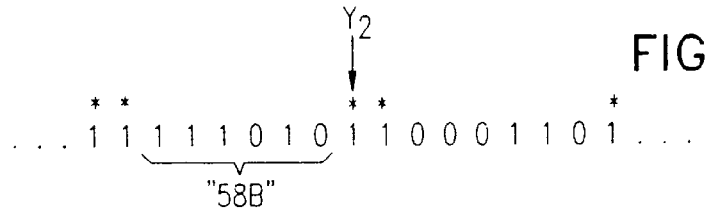

Reference is now made to FIGS. 11A, 11B and 11C, which illustrate the operation of the embodiment of FIGS. 9–10D. FIG. 11A shows a portion of the pattern of FIG. 10B and indicates, at reference numeral 80, a portion of the pattern which can be seen by a pointer 20 at a given pointer position.

FIG. 11B indicates the code sequence sensed by the pointer 20 viewing the pattern portion indicated by reference numeral 80, while FIG. 11C indicates the code sequence sensed by the pointer 20 viewing a pattern portion indicated by a reference numeral 82.

It may be appreciated from a consideration of FIGS. 11B and 11C that the coarse position of the pointer is determined by the identity of the coded 6-line pattern, while the precise position of the pointer is determined by counting the number of scan lines between the extreme illuminated scan lines that are sensed by the optical sensor. This indicates the extent of the field of view of the optical sensor. By dividing this number in half, the center of the field of view is determined and thus the precise position of the pointer is determined. The center of the field of view of the pointer is indicated as Y1 and Y2 respectively in FIGS. 11B and 11C.

Once the precise vertical position of the pointer is determined, the horizontal position is determined by means of sensing the patterns shown in FIG. 10C, using the techniques described hereinabove with reference to FIGS. 2B–3E.

Figure 12:
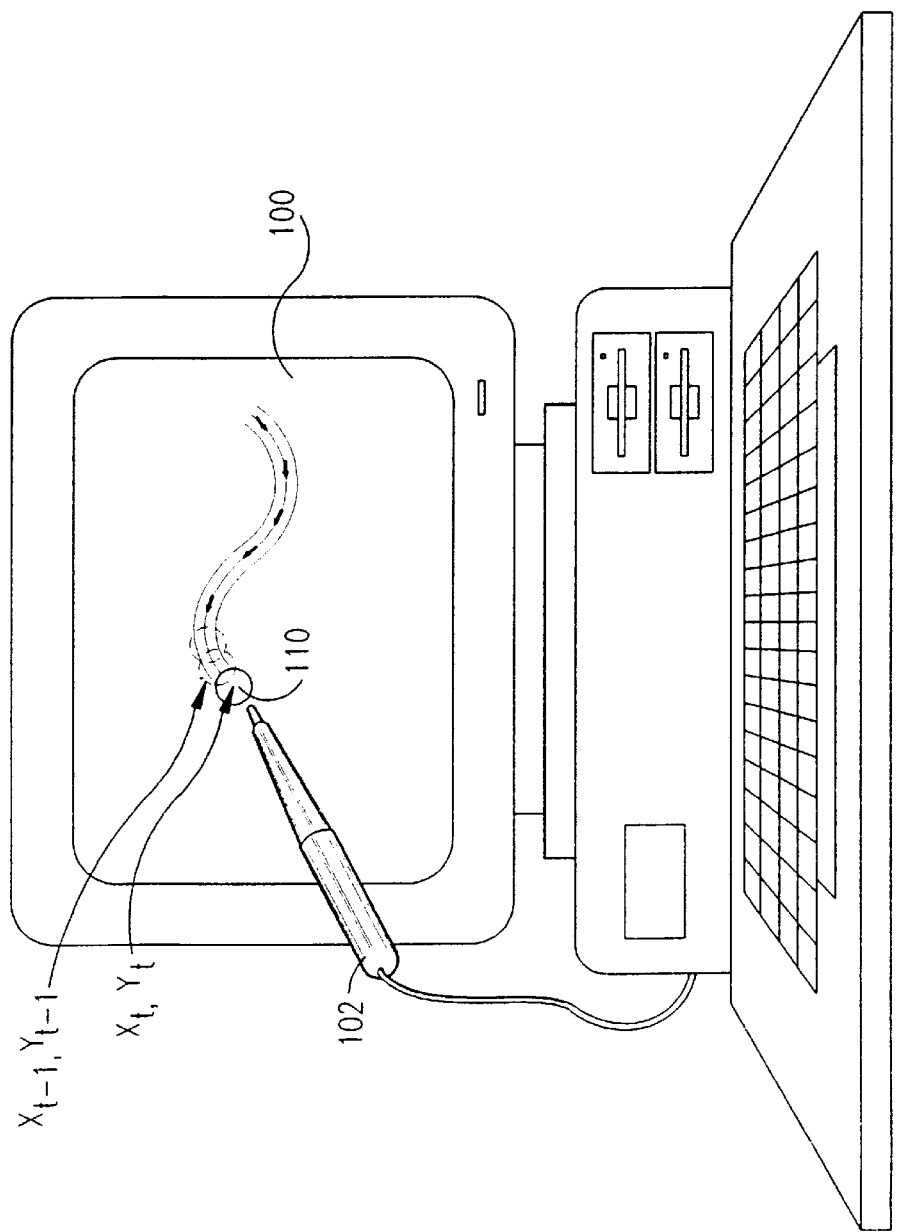
FIG. 12 is a simplified illustration of a CRT pointing system constructed and operative in accordance with yet another preferred embodiment of the present invention.

Reference is now made to FIG. 12, which is a simplified illustration of a CRT pointing system constructed and operative in accordance with yet another preferred embodiment of the present invention. The pointing system of FIG. 12 is particularly suitable for "drawing" on a display screen 100, using a pointer 102. The CRT pointing system of FIG. 12 preferably employs a multi-patterned trackable cursor dot 110, such as that shown in FIG. 13.

Figure 13:
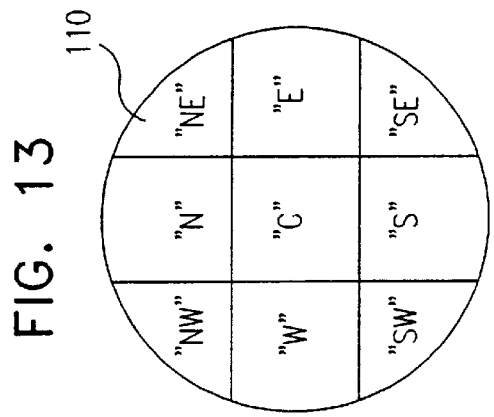
FIG. 13 is an illustration of the structure of the field of view of a trackable cursor employed in the system of FIG. 12.

FIG. 13 illustrates the structure of the trackable cursor 110 employed in the system of FIG. 12, showing preferably nine different sensing regions, each bearing a different pattern, which pattern can be distinguished one from the other by an optical sensor (not shown) in pointer 102 or by downstream circuitry associated therewith.

Figure 14A:
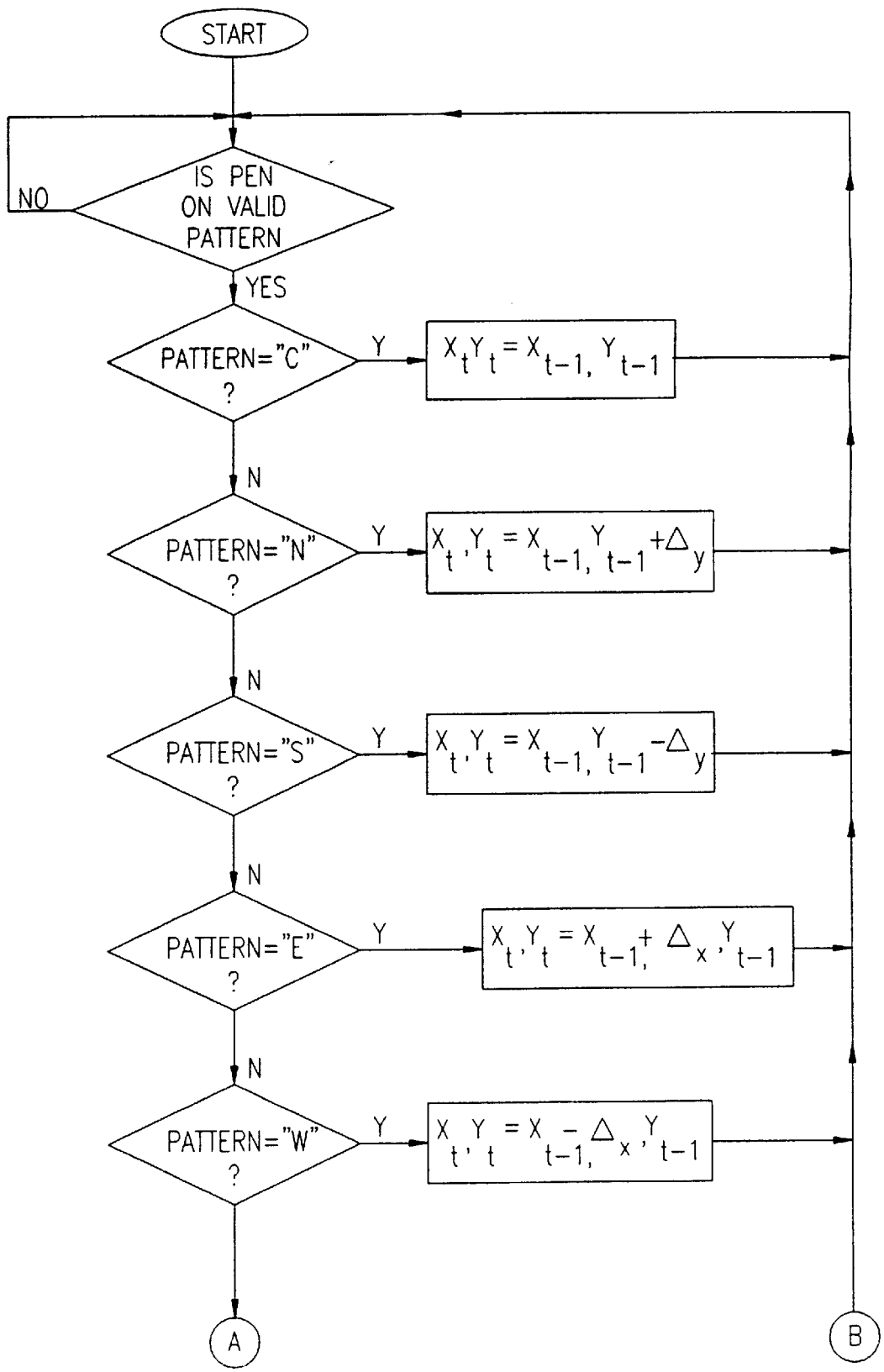
FIGS. 14A and 14B are together a flowchart illustrating the operation of the system of FIGS. 12 and 13.
Figure 14B:
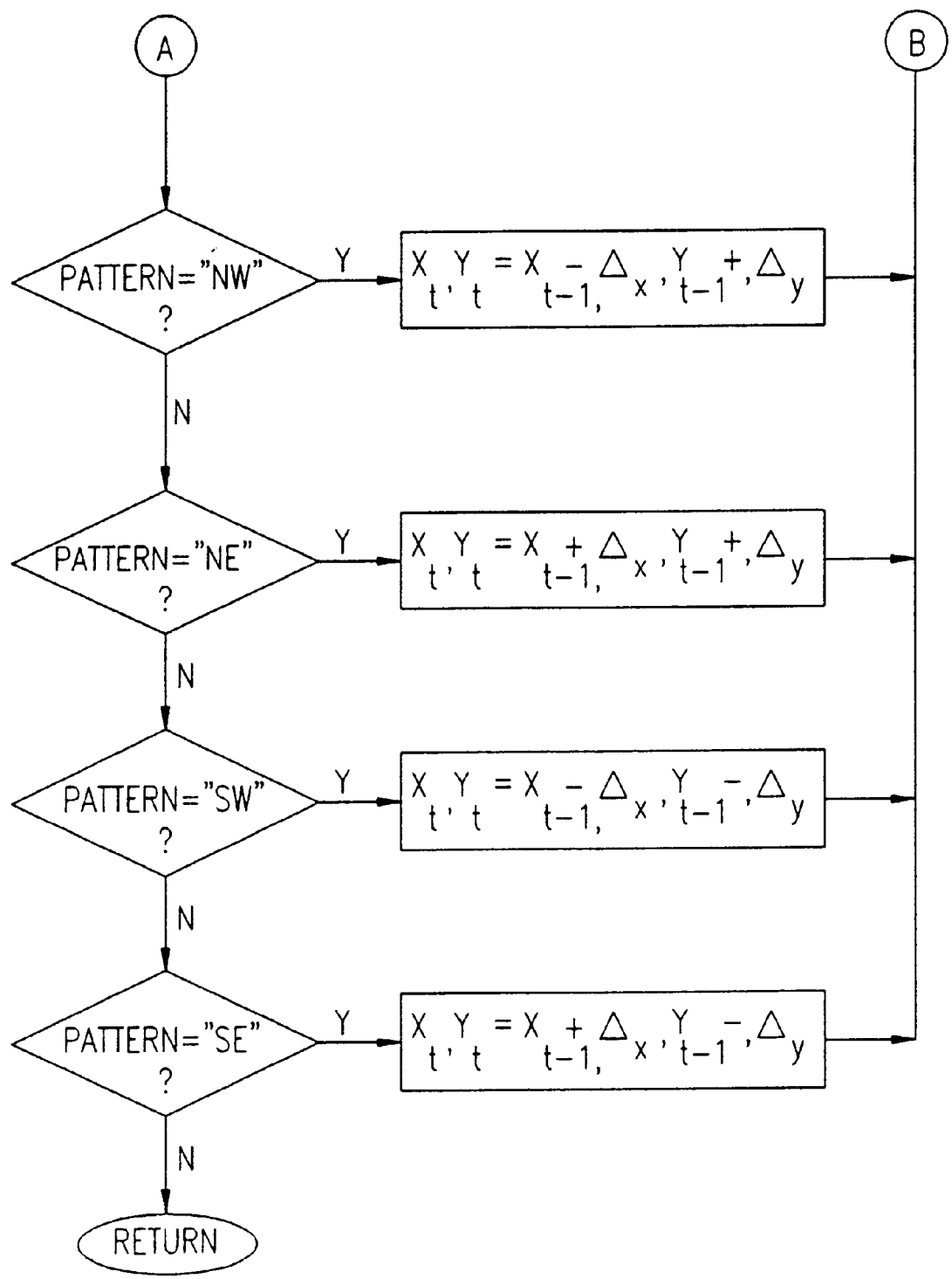

FIGS. 14A and 14B are together a flowchart illustrating the operation of the system of FIGS. 12 and 13. When the pointer 102 is directed at one of the regions of the cursor dot 110 of FIG. 13, the pattern read by the optical sensor indicates the direction of intended movement of the cursor dot. Thus, as indicated in FIGS. 14A and 14B, if the sensed pattern is the C or central pattern, the X and Y positions of the cursor dot are not changed.

If however, the optical sensor senses the pattern "N", the cursor is displaced upwardly in the next frame. Similar cursor displacements are indicated by sensing the patterns "S", "E", "W", "NW", "NE", "SW" and "SE", as indicated in FIGS. 14A and 14B.

Figure 15:
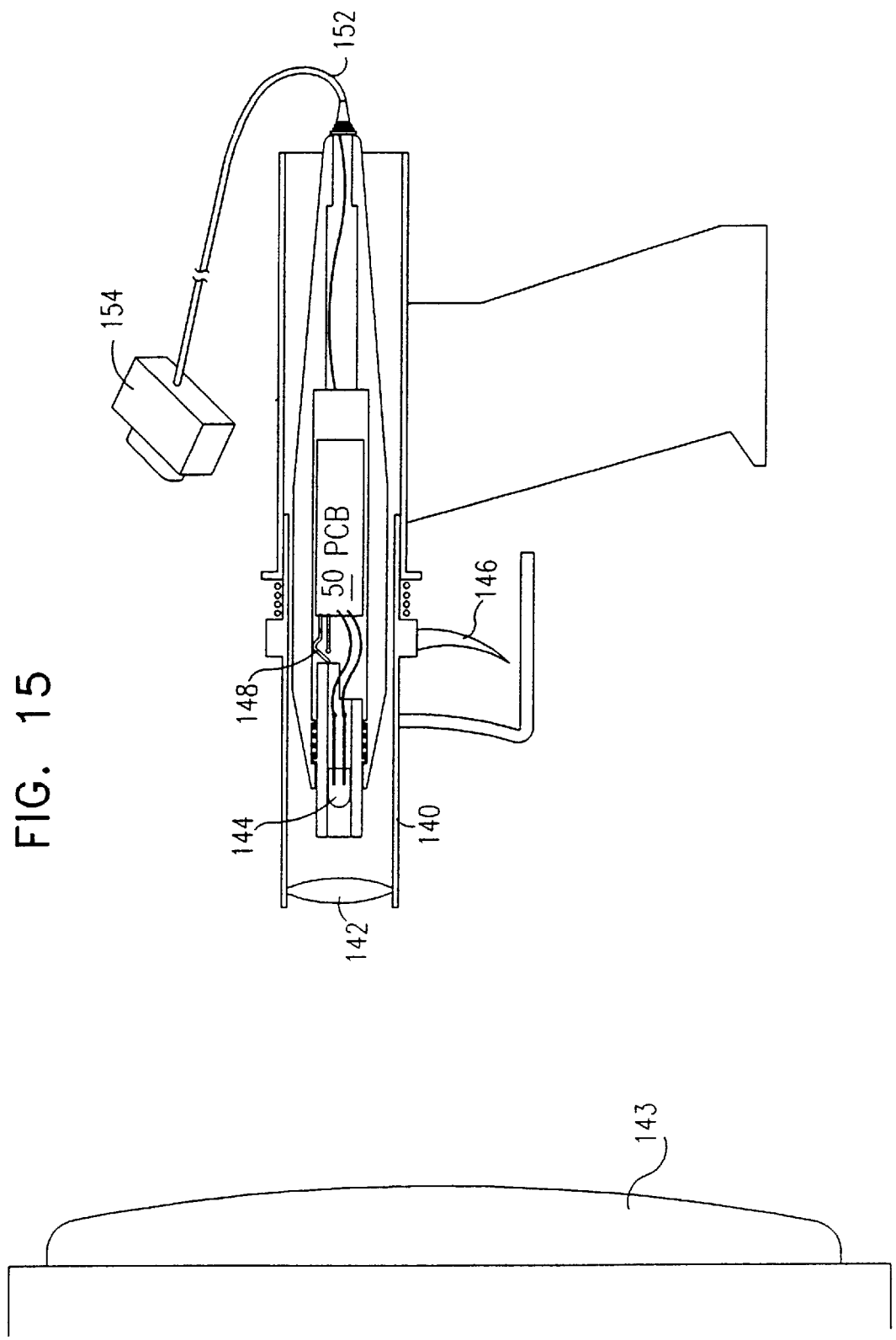
FIG. 15 is an illustration of apparatus for remote pointing in accordance with an embodiment of the present invention.

Reference is now made to FIG. 15, which is an illustration of apparatus for remote pointing in accordance with an embodiment of the present invention. The pointer of FIG. 15 typically comprises a generally gun-shaped housing 140 having a lens 142 at the front thereof for viewing a given location on a display screen 143. An optical sensor 144, such as a Motorola MRD3056 phototransistor, is provided at the focal plane of lens 142. A trigger 146 is operative to close a switch, shown schematically at reference numeral 148. The output of optical sensor 144 is preferably supplied to processing circuitry located on a printed circuit board 150 which communicates via a cable 152 or alternatively in a wireless manner, and a connector 154 with suitable circuitry within circuit board housing 12 (FIG. 1).

It will be appreciated by persons skilled in the art that the present invention is not limited by what has been particularly shown and described hereinabove but rather extends to equivalents of the structures and features described and shown as well as to various combinations and subcombinations of those feature which are not known or obvious from the prior art.

APPENDIX 1

// Light Pen HEX Module

:10000000040028006700400E702030AE802030A6C
:10001000008070C2600040065061A0A000000000C
:10002000000000000000000000000000000E702E7
:100030000B0A0708DD09280028024307C10A070246
:100040002B00DD09280028024307C10A07022C0003
:10005000DD09280028024307C10A07022D00DD0937
:100060002800280028024307C10A07022E000B02CB0911
:100070002B000C02CB092C000D02CB092D000E0227
:10008000CB092E006700400C8B004306A702400CF2
:100090008C0043074F0A07060308A702500A6700AF
:1000A000400C8D004307580A07060308A702590AA7
:1000B0006700400C8E004307660A07060308A70284
:1000C000400C8F004307660A070603086700200CF0
:1000D0008B004306A702200C8C004307710AA7027D
:1000E000720A6700200C8D004307900AA702030CD8
:1000F000870043077C0A0008200C8E004307900A03
:100100000A702030C87004307860A0008200C8F0013
:100110004307900AA702030C87004307900A0008D0
:100120006700200C8B004306A702200C8C004306BE
:100130000A702200C8D004306A702200C8E00430668
:1001400000A702200C8F004306A702270243060708D8
:100150006700400C8B004306A702400C8C0043064E
:100160000A702400C8D004306A702400C8E004306F8
:100170000A702400C8F004306A702270243060708888
:1001800000608800C88004307C60A0408600C880033
:1001900043070708050827003C0C87000306FF08F3
:1001A000280C8700030680081A0C870003066008E5
:1001B000E0C8700030640082008670065072OA66
:1001C000A702DE0A6506E60AA702E20A1A0C870001
:1001D000030700083C0C87000306FF08280C870073
:1001E000030680086008F00C2500FC0C0500FF0CDD
:1001F000200FF0C2600000C060004004507030B5C
:100200000F0C2600FD0A09092600070F4306FD0A08
:0A021000140C0009070C2600FD0A7B
:0203FE00F30A00
:00000001FF

We claim:

1. A display pointing device comprising:

a user pointable housing;

an optical sensor mounted in the housing and being operative for sensing optically sensible characteristics of at least one spatial pattern in a region on a display which is pointed to by said user pointable housing and providing an output representing said region; and processing circuitry receiving said output from said optical sensor and identifying said at least one spatial pattern appearing at said region of said display pointed to by said housing based on optically sensible characteristics of said at least one spatial pattern, said processing circuitry providing an input for use by a computer driving said display.

2. A device according to claim 1 and wherein said at least one spatial pattern comprises a plurality of different spatial patterns which appear in a time sequence at said region and wherein said processing circuitry identifies said at least one spatial pattern based on optically sensible characteristics of said plurality of spatial patterns.

3. A device according to claim 1 and wherein said at least one pattern is superimposed on a displayed image.

4. A device according to claim 2 and wherein said at least one pattern is superimposed on a displayed image.

5. A device according to claim 1 and wherein said at least one pattern is superimposed on a displayed image by eliminating lines in said displayed image.

6. A device according to claim 1 and wherein said at least one pattern covers generally an entire screen of said display.

7. A device according to claim 1 and wherein said at least one pattern covers parts of a screen of said display.

8. A device according to claim 1 and wherein said processing circuitry employs pattern recognition circuitry.

9. A device according to claim 1 and also comprising a display.

10. A device according to claim 9 and wherein said display is a CRT display.

11. A device according to claim 9 and wherein said display is a liquid crystal display.

12. A display pointing method including:
pointing an optical sensor mounted in a housing at a region on a display;
causing said optical sensor mounted in said housing to sense optically sensible characteristics of at least one spatial pattern in said region on said display which is pointed to by said optical sensor and to provide an output representing said region;
receiving said output from said optical sensor; and
identifying said at least one spatial pattern appearing at said region of said display pointed to by said optical sensor based on optically sensible characteristics of said at least one spatial pattern sensed by said optical sensor.

13. A method according to claim 12 and wherein said step of identifying a location employs optically sensible characteristics of a plurality of different spatial patterns which appear in a time sequence at said region.

14. A method according to claim 12 and wherein said at least one pattern is superimposed on a displayed image.

15. A method according to claim 13 and wherein said at least one pattern is superimposed on a displayed image.

16. A method according to claim 12 and wherein said at least one pattern is superimposed on a displayed pattern by eliminating lines in said displayed image.

17. A method according to claim 12 and wherein said at least one pattern covers generally an entire screen of said display.

18. A method according to claim 12 and wherein said at least one pattern covers parts of a screen of said display.

19. A method according to claim 12 and wherein the determination step employs pattern recognition.

20. A method system according to claim 12 and wherein said optical sensor views a CRT display.

21. A method according to claim 12 and wherein said optical sensor views a liquid crystal display.

22. A method according to claim 19 and wherein said pattern recognition employs an unambiguous pattern of scan lines.

23. A display pointing device comprising:
a user pointable housing;
an optical sensor mounted in the housing and being operative for sensing optically sensible characteristics of a region on a display which is pointed to by said user pointable housing and providing an output representing said region;
processing circuitry receiving said output from said optical sensor and identifying at least one pattern appearing at said region of said display pointed to by said housing based on optically sensible characteristics of said at least one pattern; and
a user actuable trigger operative in association with said display to cause said pattern to appear on said display in response to trigger actuation.

24. A display pointing device according to claim 23 and wherein said user actuable trigger is operative in association with said display to cause said pattern to appear on said display at said region on said display which is pointed to by said user pointable housing.

25. A display pointing system comprising:
a computer;
a display driven by said computer;
a display pointing device including:
a user pointable housing;
an optical sensor mounted in the housing and being operative for sensing optically sensible characteristics of at least one spatial pattern in a region on a display which is pointed to by said user pointable housing and providing an output representing said region; and
processing circuitry receiving said output from said optical sensor and identifying said at least one spatial pattern appearing at said region of said display pointed to by said housing based on optically sensible characteristics of said at least one spatial pattern, said processing circuitry providing an input for use by a computer driving said display.

26. A system according to claim 25 and wherein said at least one spatial pattern comprises a plurality of different spatial patterns which appear in a time sequence at said region and wherein said processing circuitry identifies said at least one spatial pattern based on optically sensible characteristics of said plurality of spatial patterns.

27. A system according to claim 25 and wherein said display pointing device also comprises:
a user actuable trigger operative in association with said display to cause said pattern to appear on said display in response to trigger actuation.

28. A system according to claim 25 and wherein said input provided by said processing circuitry is employed by said computer to terminate display of said at least one spatial pattern.

29. A system according to claim 28 wherein said computer is part of an interactive system and wherein said input provided by said processing circuitry is also employed by said computer as a user interactive input causing said interactive system to respond thereto.

30. A system according to claim 27 and wherein said spatial pattern appears briefly following said trigger actuation and prior to provision of said input to said computer by said processing circuitry.

31. A display pointing device according to claim 1 and wherein said user pointable housing is in the shape of a firearm.

32. A display pointing device according to claim 1 and wherein said user pointable housing is in the shape of a pen.

* * * * *